United States Patent
Staebler et al.

(10) Patent No.: US 7,979,479 B2
(45) Date of Patent: Jul. 12, 2011

(54) TRANSACTION-CONTROLLED GRAPH PROCESSING AND MANAGEMENT

(75) Inventors: Benno Staebler, Holzgerlingen (DE); Knut Stolze, Jena (DE); Christian Zentgraf, Friedrichroda (DE)

(73) Assignee: International Business Machines Corporation, Armonk, NY (US)

( * ) Notice: Subject to any disclaimer, the term of this patent is extended or adjusted under 35 U.S.C. 154(b) by 364 days.

(21) Appl. No.: 12/350,295

(22) Filed: Jan. 8, 2009

(65) Prior Publication Data

US 2010/0174694 A1 Jul. 8, 2010

(51) Int. Cl.
*G06F 17/30* (2006.01)
(52) U.S. Cl. .......................... 707/826; 707/812; 707/798
(58) Field of Classification Search ................... 707/798, 707/803, 810, 812, 826
See application file for complete search history.

(56) References Cited

U.S. PATENT DOCUMENTS

| | | | |
|---|---|---|---|
| 5,864,851 A * | 1/1999 | Breitbart et al. ........................ 1/1 |
| 6,971,096 B1 * | 11/2005 | Ankireddipally et al. .... 718/101 |
| 7,111,013 B2 * | 9/2006 | Federighi et al. ............. 707/639 |
| 7,424,530 B2 * | 9/2008 | Chagoly et al. ............... 709/224 |
| 7,661,106 B1 * | 2/2010 | Ankireddipally et al. .... 718/101 |
| 2009/0030863 A1 * | 1/2009 | Stanfill et al. .................. 706/45 |

OTHER PUBLICATIONS

K. Stolze, Transaction IDs in DB2, Technical Report, IBM DB2 developerWorks, May 2005, http://www.ibm.com/developerworks/db2/library/techarticle/dm-0505stolze2/, 7 pages.
K. Stolze, Section 4 of Integration of Spatial Vector Data in Enterprise Relational Database Environments, PhD thesis, University of Jena, Germany 2006, http://www.informatick.uni-jena.de/dbis/alumni/stolze/diss.pdf, 58 pages.

* cited by examiner

*Primary Examiner* — Cam-Linh Nguyen
(74) *Attorney, Agent, or Firm* — Cantor Colburn LLP; Terry Carroll

(57) ABSTRACT

A method, system, and computer program product for transaction-controlled graph processing and management are provided. The method includes notifying an external component of a database management system (DBMS) controlled transaction including multiple operations, and acquiring a DBMS transaction identifier associated with the transaction at the external component. The method further includes storing the DBMS transaction identifier as an external component transaction identifier, and receiving notification at the external component of events associated with the operations. The method additionally includes monitoring the events for an end-of-transaction operation, and passing notification of the end-of-transaction operation to an external routine.

14 Claims, 4 Drawing Sheets

300

```
CREATE PROCEDURE getTransactionId (
        OUT transactionId CHAR (13) FOR BIT DATA )
    LANGUAGE SQL
    BEGIN
        DECLARE CONTINUE HANDLER FOR SQLSTATE '42710'
            BEGIN END;
        DECLARE GLOBAL TEMPORARY TABLE session . txid (
                id CHAR (13) FOR BIT DATA NOT NULL )
            ON COMMIT DELETE ROWS ON ROLLBACK DELETE ROWS
            NOT LOGGED ;
        SET transactionId = ( SELECT id
                        FROM session . tx_id );
        IF transactionId IS NULL THEN
            SET transactionId = GENERATE_UNIQUE ();
            INSERT INTO session . tx_id
            VALUES ( transactionId );
        END IF;
    END@
```

FIG. 3

TRANSACTION-CONTROLLED GRAPH PROCESSING AND MANAGEMENT

BACKGROUND

The present invention relates to database management, and more specifically, to graph processing and management for relational database systems.

Relational database systems are often used as plain storage media. Applications access the database systems to retrieve data and implement any necessary data processing on the data in an application layer. One example is management of hierarchies, such as employee hierarchies or the organization of sales regions. The associated databases store relationships between people or regions, but evaluating those relationships requires either complicated structured query language (SQL) statements or additional processing performed at a higher level in the applications.

The concept of hierarchies can be generalized to graph structures. While network or graph structures can be stored in a relational model, graph operations are not typically available in the database systems. For example, a pipe network may be represented in a database by storing each pipe, connectors, and connecting pipes, etc. But determining the maximum possible flow between two points in the pipe network is not directly supported by database systems using SQL. One example where graph or network data structures are very prominent is in the field of spatial data information systems, such as geographic information systems (GISs). GISs manage spatial data such as streets, canals, areas, buildings, etc. Solutions typically store geometric information (e.g., location and shape of streets) along with non-spatial attributes (e.g., street names), but processing at the database level is rather limited.

SUMMARY

According to one embodiment of the present invention, a method for transaction-controlled graph processing and management is provided. The method includes notifying an external component of a database management system (DBMS) controlled transaction including multiple operations, and acquiring a DBMS transaction identifier associated with the transaction at the external component. The method further includes storing the DBMS transaction identifier as an external component transaction identifier, and receiving notification at the external component of events associated with the operations. The method additionally includes monitoring the events for an end-of-transaction operation, and passing notification of the end-of-transaction operation to an external routine.

Another embodiment is a system including a data storage device with a data table and a host system adapted for executing an application. The application accesses a database management system (DBMS) and requests performance of operations. The DBMS notifies an external component of a DBMS controlled transaction comprising multiple operations, and associates a DBMS transaction identifier with the DBMS controlled transaction. The DBMS further performs the operations on the data table, the data table holding data associated with an object managed by the external component. The DBMS notifies the external component of events associated with the operations, including an end-of-transaction operation.

A further embodiment is a computer program product that includes a storage medium readable by a processing unit and storing instructions for execution by the processing unit for implementing a method. The method includes receiving notification at a graph manager of a database management system (DBMS) controlled transaction of multiple operations, and acquiring a DBMS transaction identifier associated with the transaction at the graph manager. The method performed by the computer program product further includes storing the DBMS transaction identifier as a graph transaction identifier, receiving notification of events associated with the operations, monitoring the events for an end-of-transaction operation, and passing notification of the end-of-transaction operation to graph operation logic.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 3 depicts an example of a procedure to create a unique transaction identifier in accordance with exemplary embodiments.

DETAILED DESCRIPTION

Figure 1:
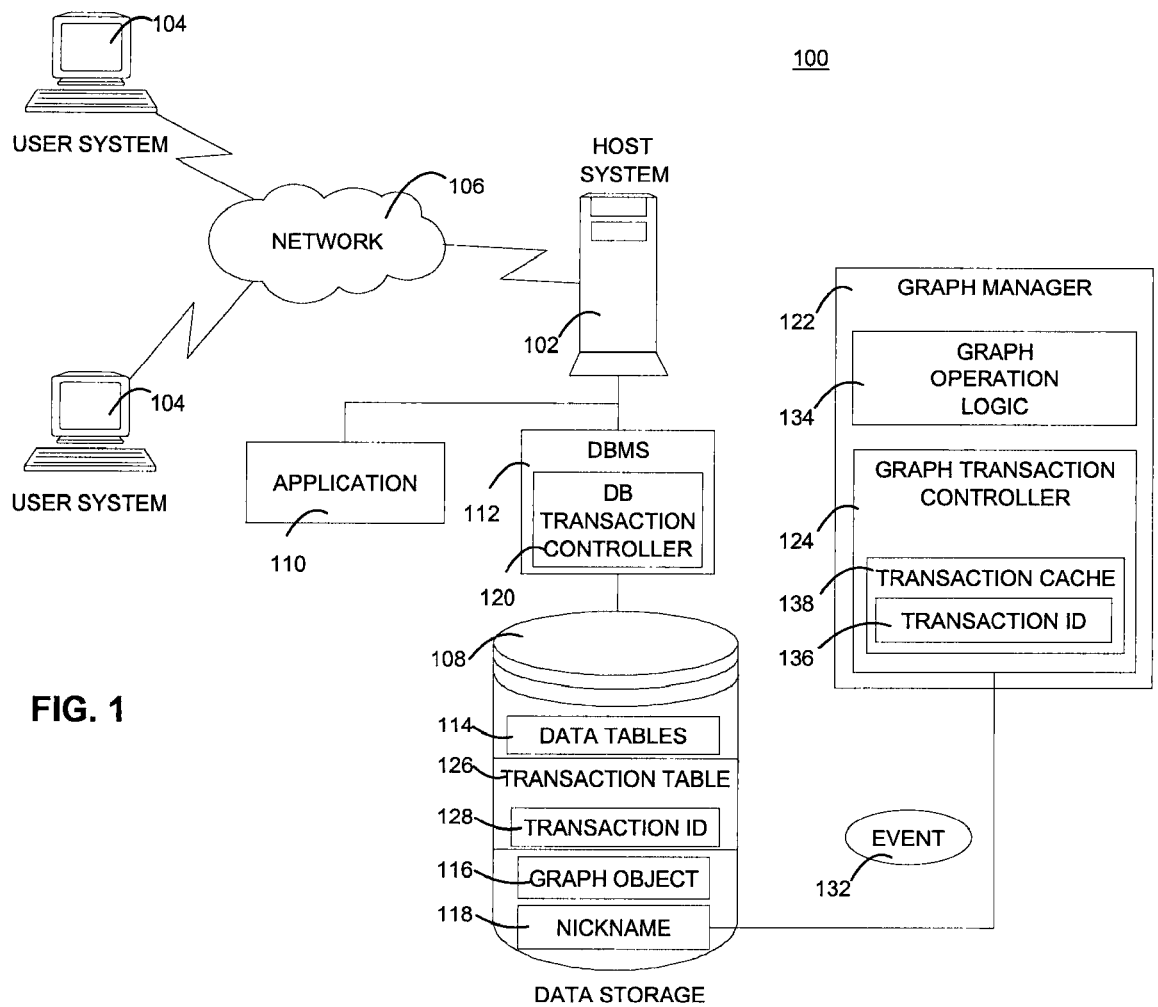
FIG. 1 depicts a system for transaction-controlled graph processing and management in accordance with exemplary embodiments.

The invention as described herein provides transaction-controlled graph processing and management for relational database systems. While some existing database systems have support for managing spatial data, such as data types to model geometries (e.g., points, linestrings, and polygons) or data structures that allow for efficient queries against spatial data, the database systems cannot perform graph operations on the graph data natively. A linestring is a one-dimensional object representing a sequence of points and the line segments connecting them, while a polygon is a two-dimensional surface stored as a sequence of points defining an exterior bounding ring and zero or more interior rings. The graph data is typically either inherent to the spatial data or it can be derived from it. For example, performing a graph operation to find the shortest route between two points along streets stored in a database as linestrings may not be supported by a database management system (DBMS) natively. An application requiring this kind of functionality can retrieve the data from the database, build a graph from it, apply a graph operation to determine the shortest path, and then continue using the result of the graph operation, i.e., the points or line segments that comprise the shortest path. As the graph is managed independently of the data used to create it, issues can arise when operations performed on the data fail but changes are successfully performed on the graph. For example, an attempt to commit changes to the data in a database as part of a transaction can fail to complete, resulting in undoing/rolling back the changes before the transaction completes. A transaction is a group of database operations combined into a logical unit of work that is either wholly committed or rolled back. Information about the success or failure of the transaction may be internally managed by the DBMS. In an exemplary embodiment, one or more external components are notified of events associated with transactions such that the external components can respond to the events.

A transaction in the context of a database system can include multiple operations that must be correctly performed in order for the transaction to successfully complete. Transactions are atomic, appear externally consistent, are performed in isolation, and are durable. Each transaction may represent a unit of work, such as collectively performing insert, query, and update operations in a single transaction. If a transaction is initiated via the DBMS that triggers a graph manager as an external component to insert one or more vertices into a graph that corresponds to a data item inserted in a data table, the graph manager may be unaware of a failure of an update operation as part of the database transaction. Such a scenario may occur when the failure is internal to the DBMS, resulting in a mismatch between the graph and the underlying data upon which the graph is based. However, using transaction-controlled graph processing, operations applied to the data trigger events to notify the graph manager. The graph manager can track operations associated with transaction identifiers that correspond to transaction identifiers managed by the DBMS. In an exemplary embodiment, the graph manager utilizes existing DBMS interfaces to track transaction identifiers. The relationship between the DBMS and the graph manager may be implemented in a transparent fashion to an application that requests graph operations through the DBMS. Thus, tasks performed by the graph manager may appear as if they are performed by the DBMS although the graph manager is external to the DBMS.

Turning now to the drawings, it will be seen that in FIG. 1 there is a block diagram of a system 100 upon which transaction-controlled graph processing and management is implemented in exemplary embodiments. The system 100 of FIG. 1 includes a host system 102 in communication with user systems 104 over a network 106. In exemplary embodiments, the host system 102 is a high-speed processing device (e.g., a mainframe computer, a desktop computer, a laptop computer, or the like) including at least one processing circuit (e.g., a CPU) capable of reading and executing instructions, and handling numerous interaction requests from the user systems 104. In alternative exemplary embodiments, the host system 102 is an application specific computer. The host system 102 may perform as a data management system for accessing a data storage device 108. The host system 102 can serve as a Web server, applications server, and/or a database server.

In exemplary embodiments, the user systems 104 comprise desktop, laptop, general-purpose computer devices, and/or I/O devices, such as keyboard and display devices, which provide an interface for communicating with the host system 102. Users can initiate various tasks on the host system 102 via the user systems 104, such as requesting data and operations on the data. The user systems 104 can interact with an application 110 executed upon the host system 102 that interfaces with a DBMS 112 to access the data storage device 108. Operations at the host system 102 may also be triggered without user intervention; for example, a batch system can perform various calculations automatically.

While only a single host system 102 is shown in FIG. 1, it will be understood that multiple host systems can be implemented, each in communication with one another via direct coupling or via one or more networks. For example, multiple host systems may be interconnected through a distributed network architecture. The single host system 102 may also represent a cluster of hosts collectively performing processes as described in greater detail herein.

The network 106 may be any type of communications network known in the art. For example, the network 106 may be an intranet, extranet, or an internetwork, such as the Internet, or a combination thereof The network 106 can include wireless, wired, and/or fiber optic links.

In exemplary embodiments, the host system 102 accesses and stores data to the data storage device 108 via the DBMS 112. The data storage device 108 refers to any type of computer readable storage medium and may comprise a secondary storage element, e.g., hard disk drive (HDD), tape, or a storage subsystem that is internal or external to the host system 102. Types of data that may be stored in the data storage device 108 include, for example, various files and databases. It will be understood that the data storage device 108 shown in FIG. 1 is provided for purposes of simplification and ease of explanation and is not to be construed as limiting in scope. To the contrary, there may be multiple data storage devices 108 utilized by the host system 102 or accessed via federation. Federation establishes relationships between data locally managed by the host system 102 and other data sources, such as data on one or more remote systems, making remote data readily available to the DBMS 112. In an exemplary embodiment, federation is used to link operations of the DBMS 112 to an external component, notifying the external component of operations and/or various events.

Figure 2:
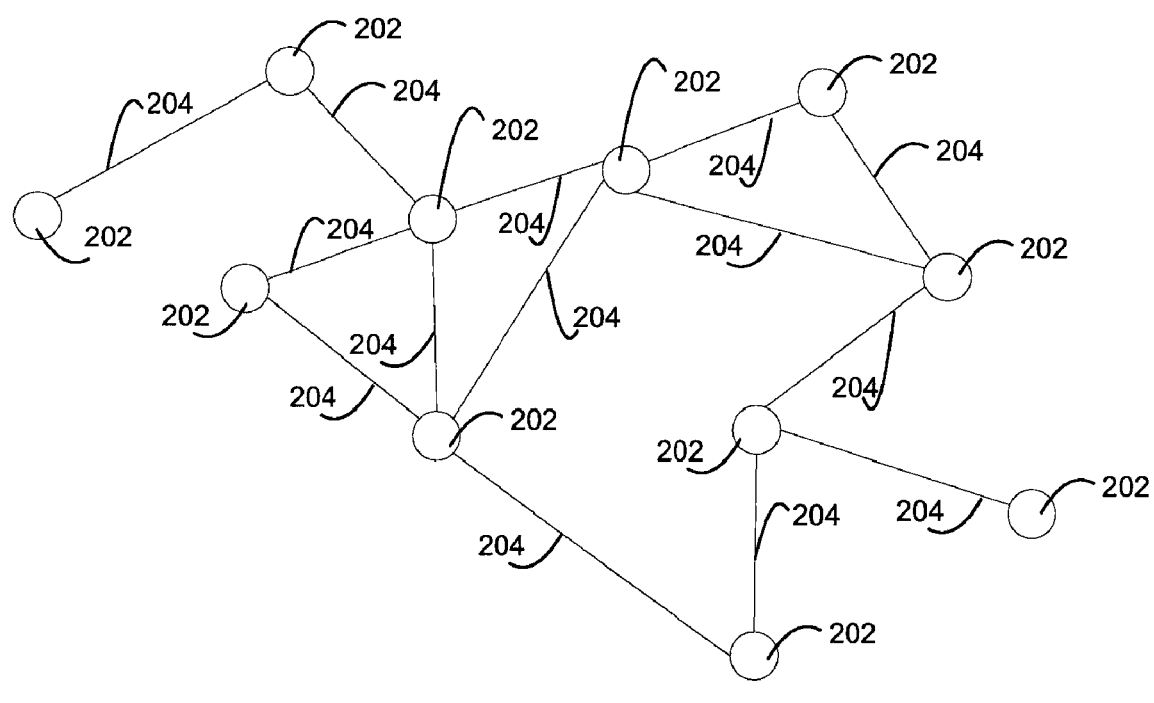
FIG. 2 depicts an example of a graph in accordance with exemplary embodiments.

The application 110 may interact with data stored and managed in a hierarchical or linked architecture, such as a graph. An example of a graph 200 is depicted in FIG. 2, where multiple vertices 202 are interconnected via edges 204. The graph 200 represents an arbitrary example of a hierarchical or network structure that can be employed in a variety of applications, such as a geographic mapping application. The application 110 can directly request that an external component perform graph operations on the graph 200, or the application 110 can pass graph operation requests to the DBMS 112 of FIG. 1.

Continuing with the description of FIG. 1, in exemplary embodiments, the data storage device 108 includes data tables 114 holding persistent data associated with a graph object 116. The data tables 114 represent relational tables that may hold spatial information and non-spatial attributes, for example, street shapes, locations, and names. The graph object 116 can be populated based on the contents of the data tables 114, and include structural relationships as depicted in the graph 200 of FIG. 2. SQL commands can be used to retrieve the data to construct the graph object 116. Alternatively, the graph object 116 may be initialized as an empty graph, which contains no vertices and edges, yet. Along with construction of the graph object 116, a nickname 118 is created. The nickname 118 supports federation through the DBMS 112 with an external component to link activities that affect the graph object 116. Federation via the nickname 118 provides an interface to intercept and react on end-of-transaction conditions, such as commit and/or rollback operations, as well as other events.

The DBMS 112 includes a database transaction controller 120 to manage transactions involving the data tables 114. The database transaction controller 120 can create an internally managed transaction identifier associated with a sequence of operations, such as insert and update operations on the data tables 114. Changes to the data tables 114 may also impact the graph object 116. In an exemplary embodiment, a graph manager 122 manages operations on the graph object 116. The graph manager 122 is an external component relative to the DBMS 112 that interfaces to the nickname 118. The graph manager 122 manages its own transactions via graph transaction controller 124, uniquely identifying database transactions (also referred to as "DBMS transactions") and associating them with its own transactions. In order to reverse/undo changes made to the graph object 116 if a DBMS transaction is being rolled back, the graph manager 122 tracks DBMS transactions and maps them to graph transactions. The graph manager 122 may utilize publicly available function calls or access log files to acquire DBMS transaction identifiers. It will be understood that the graph manager 122 can be integrated with the DBMS 112 within the scope of the invention; however, the DBMS 112 need not be internally modified.

Alternatively, the graph manager 122 need not rely on DBMS 112 internal transaction identifiers, but rather establish an infrastructure to retrieve a unique identifier for each transaction. A DBMS 112 internal transaction identifier may remain stable within the transaction but changes once the transaction is completed. A global temporary table, for example, transaction table 126, can be used to temporarily capture transaction identifiers. To generate a stable transaction identifier, a GENERATE UNIQUE function can be used as part of a procedure to returns a unique identifier for each transaction. The unique identifier, as independently generated, becomes the transaction identifier used for further processing and tracking. An example of such as procedure is depicted in FIG. 3 as procedure getTransactionId 300. Executing the procedure getTransactionId 300 may result in writing a unique DBMS transaction ID 128 to the transaction table 126. If the temporary table, transaction table 126, does not yet exist, it is created. If the transaction table 126 already contains the DBMS transaction ID 128 (presumably because the procedure 300 was already called for the current transaction), the previously generated ID is returned. If no ID is found, then this is the first call in the current transaction and a new DBMS transaction ID 128 is generated, inserted into the transaction table 126 and then returned.

As previously described, the graph manager 122 is attached to the nickname 118. Thus, any operation applied to the nickname 118 causes an event 132 to be sent to the graph manager 122. This may include insert, update, and delete operations on the nickname 118, as well as queries and end-of-transaction operations.

When a data modification is applied to the graph object 116, e.g., vertices 202 or edges 204 are added to or deleted from graph 200 of FIG. 2, a write operation on the nickname 118 is triggered. The write operation includes the DBMS transaction ID 136. The write operation can either be initiated from within graph operation logic 134 that add vertices/edges (for instance, add vertex and add edge functions), or a trigger can be created on the database tables 114 containing data from which the graph object 116 is derived. The graph operation logic 134 includes external routines relative to the DBMS 112, and may include user-defined functions registered in the DBMS 112. While graph operation logic 134 resides in the graph manager 122, the DBMS 112 can invoke the graph operation logic 134 via an interface. If one or more user-defined functions registered in the DBMS 112 are called, the DBMS 112 may transparently invoke the corresponding graph operation logic 134. In response to calling the graph operation logic 134 through the DBMS 112 from application 110 or user system 104 or performing an insert/update/delete operation on the data tables 114, an insert, update, or delete operation on the nickname 118 is driven. The DBMS 112, as federated server, knows that the nickname 118 participates in the current transaction, which results in triggering the event 132. Commit/rollback operations as well as graph modification operations are passed on to the external component behind the nickname 118 (i.e., graph manager 122) since it is part of the federation. Without the operation on the nickname 118, the DBMS 112 may apply a simple optimization: external components that are not touched in the current transaction do not receive any commit/rollback operations. This approach may be employed, with nothing committed or rolled back, since the operations did not impact the external component. A write operation on the nickname 118 can deactivate this optimization.

In an exemplary embodiment, the graph transaction controller 124 of the graph manager 122 attached to the nickname 118 receives the notification of the insert/update/delete event 132, extracts the DBMS transaction ID 128, and maps the DBMS transaction ID 128 to a graph transaction ID 136. The graph transaction ID 136 is an external component transaction identifier that represents the collection of graph operations that correspond to the database operations for the DBMS transaction ID 128. The DBMS transaction ID 128 may be embedded in the event 132 or the event 132 may trigger extraction of the DBMS transaction ID 128 from the transaction table 126. The graph transaction controller 124 stores the graph transaction ID 136 in transaction cache 138, so that an eventually arriving commit/rollback operation can be associated with it before being passed on to external routines, such as the graph operation logic 134.

Modifications on the graph object 116 are driven through existing infrastructure, e.g., functions such as add vertex and add edge functions in the graph operation logic 134. Thus, no changes to the application 110 are required if the application 110 uses functions of the graph operation logic 134 directly. Internally, the graph manager 122 maps database operations to graph operations that may be managed using the graph transaction control 124.

Figure 4:
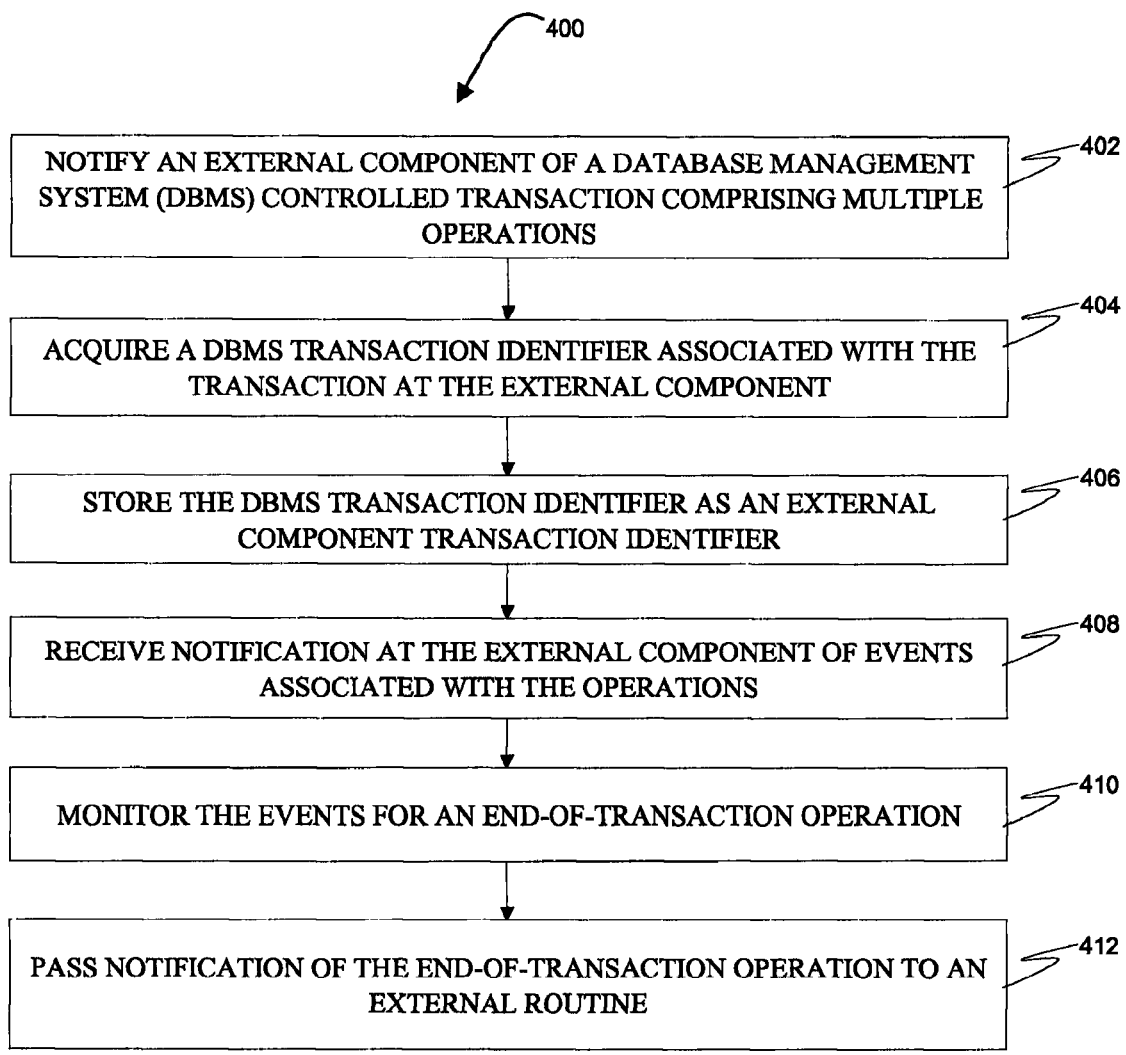
FIG. 4 depicts an exemplary process for transaction-controlled graph processing and management.

Turning now to FIG. 4, a process 400 for transaction-controlled graph processing and management will now be described in accordance with exemplary embodiments, and in reference to FIG. 1. As previously described, the DBMS 112 applies federation to associate operations on data tables 114 with nickname 118. The nickname 118 is attached to the graph transaction controller 124 to establish a link to receive notification of events (e.g., event 132) associated with the operations. The DBMS 112 performs the operations on data tables 114 holding data associated with graph object 116, where the graph manager 122 manages the graph object 116.

At block 402, the DBMS 112 notifies the graph manager 122, as an external component of the DBMS 112, of a DBMS controlled transaction including multiple operations. At block 404, the graph manager 122 acquires DBMS transaction identifier 128 associated with the transaction. The graph manager 122 can acquire the DBMS transaction identifier 128, such as publicly available interfaces, log files, or accessing transaction table 126. The DBMS 112 may populate the transaction table 126 through reading a temporary internal transaction identifier, generating a unique identifier from the temporary internal transaction identifier, and storing the unique identifier as the DBMS transaction identifier 128 in the transaction table 126. Additionally, the event 132 can include DBMS transaction identifier 128. The graph transaction controller 124 of the graph manager 122 may receive the notification of the events associated with the operations, extract the DBMS transaction identifier 128, and map the DBMS transaction identifier 128 to graph transaction identifier 136. At block 406, the graph transaction controller 124 of the graph manager 122 stores the DBMS transaction identifier 128 as the graph transaction identifier 136 in the transaction cache 138.

At block 408, the graph manager 122 receives notification events associated with the operations, such as event 132. Each transaction can include multiple operations, leading to multiple events. Tracking DBMS transactions at the graph manager 122 enables the graph manager 122 to determine specific operations that must be reversed or undone in the event that transactions fail. At block 410, the graph manager 122 monitors the events for an end-of-transaction operation. At block 412, the graph manager 122 passes notification of the end-of-transaction operation to a routine, such as the graph operation logic 134 that may implement graph operations on the graph object 116. The graph operation logic 134 can reverse graph operations associated with the graph transaction identifier 136 in response to receiving notification of a rollback operation as the end-of-transaction operation. In case of commit operations, the graph operation logic can discard any temporary information it may have maintained for the transaction.

Technical effects include establishing transaction notification between a DBMS and a graph manager as an external component relative to the DBMS. The graph manager is notified as to whether a database transaction is committed or rolled back so that graph manager can keep one or more graphs associated with the database transaction synchronized. Utilizing available "hooks" that are called by the DBMS whenever the current transaction is committed or rolled back, externally managed graphs are brought under transaction control of the DBMS. Without additional effort on the DBMS implementation, a two-phase-commit protocol can be exploited to synchronize the DBMS-internal transactions with the transactions of the graph manager. Thus, the impact to existing applications that utilize graphs is minimized. Additionally, interfaces to user-defined routines can also be maintained to avoid application changes. Federated interfaces available in the DBMS are used to retrieve notifications at transaction boundaries, i.e., commit/rollback. The graph manager responsible for externally managed data structures attaches to the federated interface. Various techniques to uniquely identify transactions can be exploited in accordance with exemplary embodiments.

The capabilities of the present invention can be implemented in software, firmware, hardware or some combination thereof As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a solid state disk, a random access memory (RAM), a read-only memory (ROM), an erasable programmable read-only memory (EPROM or Flash memory), an optical fiber, a portable compact disc read-only memory (CDROM, DVD-ROM or DVD-RAM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented method comprising:
   notifying, using a processing device, an external component of a database management system (DBMS) controlled transaction comprising multiple operations, wherein the external component is a graph manager;
   acquiring a DBMS transaction identifier associated with the transaction at the external component;
   storing the DBMS transaction identifier as an external component transaction identifier;
   receiving notification at the external component of events associated with the operations;
   monitoring the events for an end-of-transaction operation; and
   passing notification of the end-of-transaction operation to an external routine;
   wherein the graph manager receives the notification of the events associated with the operations, extracts the DBMS transaction identifier, and maps the DBMS transaction identifier to the external component transaction identifier.

2. The method of claim 1 wherein the DBMS performs the operations on a data table holding data associated with a graph object, the graph object managed by the graph manager.

3. The method of claim 2 further comprising:
   applying federation to associate the operations on the data table with a nickname;
   attaching the nickname to the graph manager to establish a link to receive the notification of the events associated with the operations.

4. The method of claim 3 further comprising:
   triggering the events in response to performing the operations on the data table or applying a modification to the graph object.

5. The method of claim 1 wherein the external routine is a user-defined function to perform graph operations.

6. The method of claim 5 wherein graph operation logic invoked via the user-defined function reverses graph operations associated with the external component transaction identifier in response to receiving notification of a rollback operation as the end-of-transaction operation, and completes the graph operations in response to a commit operation as the end-of-transaction operation.

7. The method of claim 1 wherein the DBMS transaction identifier is acquired via reading a temporary internal transaction identifier, generating a unique identifier from the temporary internal transaction identifier, and storing the unique identifier as the DBMS transaction identifier in a temporary table.

8. A system comprising:
   a data storage device comprising a data table; and
   a host system, comprising at least one processing device, and adapted for executing an application, the application accessing a database management system (DBMS) and requesting performance of operations, the DBMS performing:
   notifying an external component of a DBMS controlled transaction comprising multiple operations;
   associating a DBMS transaction identifier with the DBMS controlled transaction;
   performing the operations on the data table, the data table holding data associated with an object managed by the external component; and
   notifying the external component of events associated with the operations, including an end-of-transaction operation, wherein the external component is a graph manager and the object is a graph object managed by the graph manager, wherein the graph manager performs:
      storing the DBMS transaction identifier as a graph transaction identifier;
      receiving notification of events associated with the operations;
      monitoring the events for an end-of-transaction operation; and
      passing notification of the end-of-transaction operation to graph operation logic,
   wherein the graph operation logic reverses graph operations associated with the graph transaction identifier in response to receiving notification of a rollback operation as the end-of-transaction operation, and completes the graph operations in response to a commit operation as the end-of-transaction operation; and
      wherein the graph manager receives the notification of the events associated with the operations, extracts the DBMS transaction identifier, and maps the DBMS transaction identifier to the graph transaction identifier.

9. The system of claim 8 wherein the DBMS further performs:
   applying federation to associate the operations on the data table with a nickname;
   attaching the nickname to the graph manager to establish a link to receive the notification of the events associated with the operations; and
   triggering the events in response to performing the operations on the data table.

10. The system of claim 8 wherein the DBMS transaction identifier is acquired via reading a temporary internal transaction identifier, generating a unique identifier from the temporary internal transaction identifier, and storing the unique identifier as the DBMS transaction identifier in a temporary table.

11. A computer program product comprising:
   a non-transitory storage medium readable by a processing unit and storing instructions for execution by the processing unit for implementing a method, the method comprising:
   receiving notification at a graph manager of a database management system (DBMS) controlled transaction comprising multiple operations;
   acquiring a DBMS transaction identifier associated with the transaction at the graph manager;
   storing the DBMS transaction identifier as a graph transaction identifier;
   receiving notification of events associated with the operations;
   monitoring the events for an end-of-transaction operation; and
   passing notification of the end-of-transaction operation to graph operation logic;
   wherein the graph manager receives the notification of the events associated with the operations, extracts the DBMS transaction identifier, and maps the DBMS transaction identifier to the graph transaction identifier.

12. The computer program product of claim 11 wherein the graph operation logic reverses graph operations associated with the graph transaction identifier in response to receiving notification of a rollback operation as the end-of-transaction operation, and completes the graph operations in response to a commit operation as the end-of-transaction operation.

13. The computer program product of claim 11 wherein the DBMS performs the operations on a data table holding data associated with a graph object, the graph object managed by the graph manager.

14. The computer program product of claim 13 wherein the DBMS applies federation to associate the operations on the data table with a nickname and attaches the nickname to the graph manager to establish a link to receive the notification of the events associated with the operations, and further wherein triggering the events is performed in response to performing the operations on the data table or applying a modification to the graph object.

* * * * *